United States Patent Office 3,219,701
Patented Nov. 23, 1965

3,219,701
METHOD OF MAKING N-(HYDROXY-BENZYL) SUBSTITUTED AMINES
Francis X. O'Shea, Wolcott, Conn., assignor to United States Rubber Company, New York, N.Y., a corporation of New Jersey
No Drawing. Filed Aug. 23, 1963, Ser. No. 304,260
6 Claims. (Cl. 260—569)

This application is a continuation-in-part of my application Serial No. 299,184, filed August 1, 1963, now abandoned.

This invention is concerned with a novel method for preparing compounds of the general formula:

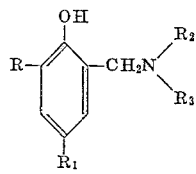

wherein R and $R_1$ are alkyl, cycloalkyl or aralkyl groups of up to 12 carbon atoms each and $R_2$ and $R_3$ are selected from the group consisting of —H, —OH, —$NR_4R_5$ (in which $R_4$ and $R_5$ may be hydrogen, alkyl, cycloalkyl, aralkyl or aryl of up to 12 carbon atoms), hydrocarbon groups such as alkyl, hydroxyalkyl cycloalkyl, aralkyl or aryl groups of up to 12 carbon atoms, and the group:

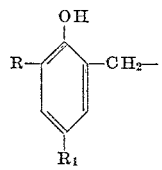

in which R and $R_1$ are as previously defined.

This method involves the reaction of one molar equivalent of a compound of the general formula:

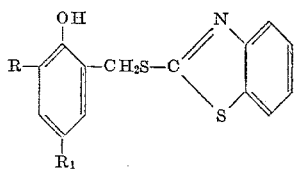

wherein R and $R_1$ are as previously defined with one molar equivalent of an alkali metal hydroxide and either (a) at least one molar equivalent of an amine of the formula $R_2R_3NH$ in which $R_2$ and $R_3$ are as previously defined or (b) 0.5 molar equivalent of an amine of the formula $R_2NH_2$ in which $R_2$ is as previously defined.

In U.S. Patent 2,363,134 (Nov. 21, 1944), R. F. McCleary described compounds of the general formula:

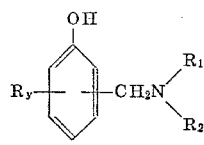

wherein R may be hydrogen, alkyl, aryl, aralkyl, cycloalkyl or naphthenyl radicals, Y may be 1–4 and $R_1$ and $R_2$ may be alkyl, cycloalkyl, aralkyl or naphthenyl radicals. The compounds, useful as lubricating oil additives, were prepared by the well-known Mannich reaction involving the reaction of a substituted phenol with formaldehyde and an appropriate amine.

In U.S. Patent 2,802,810 (Aug. 13, 1957), J. C. Bill described compounds of the general formula:

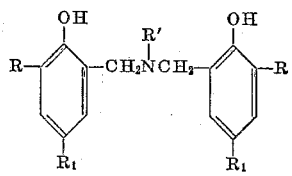

wherein R and $R_1$ are alkyl groups and R' is alkyl, alkenyl, cycloalkyl or hydroxyalkyl. These compounds were also prepared by the Mannich type procedure.

This invention differs from the prior art in the following ways:

(1) The method of the invention is novel. It has not been previously described.

(2) The method of the invention has an advantage over the Mannich reaction in the preparation of the compounds herein described in that it is broader in scope. F. F. Blicke (Adams, "Organic Reactions," vol. I, John Wiley and Sons, New York, 1942, p. 312) has stated in his review of the Mannich reaction that hydrazine fails to react and that aniline reacts only in certain instances. Thus aromatic amines, hydrazines and hydroxylamine were not mentioned in the patents of McCleary and Bill.

The method of this invention, however, is operable with a broad variety of primary and secondary amines including aliphatic amines, aromatic amines, hydrazine, substituted hydrazines and hydroxylamine.

The compounds herein described are prepared by treating one molar equivalent of a compound of the general formula:

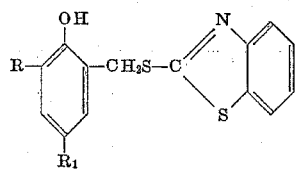

wherein R and $R_1$ are alkyl, cycloalkyl or aralkyl groups of up to 12 carbon atoms each with one molar equivalent of an alkali metal hydroxide and either (a) at least one molar equivalent of an amine of the formula $R_2R_3NH$ in which $R_2$ and $R_3$ are selected from the group consisting of —H, —OH, —$NR_4R_5$ (in which $R_4$ and $R_5$ may be hydrogen, alkyl, cycloalkyl, aralkyl or aryl) and hydrocarbon groups such as alkyl, hydroxyalkyl, cycloalkyl, aralkyl or aryl groups of up to 12 carbon atoms or (b) 0.5 molar equivalent of an amine of the formula $R_2NH_2$ in which $R_2$ is as defined above.

The equation for these reactions are therefore:

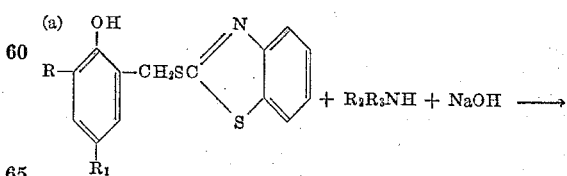

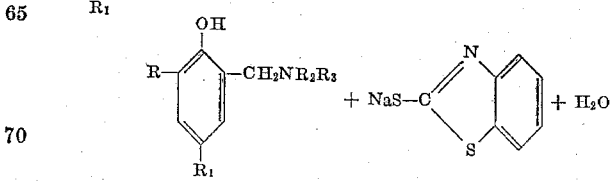

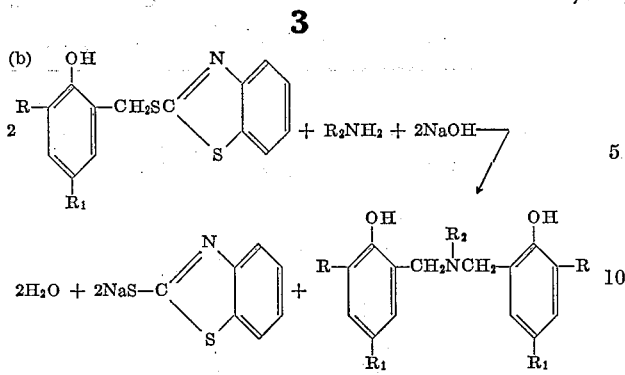

The reaction is generally carried out in an inert liquid medium, usually a suitable water miscible solvent such as methanol, ethanol, isopropanol, dioxane and ethylene glycol dimethyl ether at a temperature from about room temperature (e.g. 20° C.) to about 100° C. Ordinarily the reaction is carried out at the reflux temperature of the solution. The reaction may also be carried out in a two-phase system such as benzene-water and xylene-water, using good agitation.

The intermediate mercaptobenzothiazolylmethyl substituted phenols may be prepared from a 2,4-dialkylphenol by reaction with formaldehyde and mercaptobenzothiazole under acid catalysts in a reaction similar to that described by Sebrell in U.S. Patents 2,134,957 (Nov. 1, 1938) and 2,150,463 (Mar. 14, 1939).

The phenols which may be used include 2,4-dimethylphenol, 2-methyl-4-t-butylphenol, 2-t-butyl-4-methylphenol, 2,4-di-t-butylphenol, 2-methyl-4-cyclohexylphenol, 2-cyclohexyl-4-methylphenol, 2,4-dicyclohexylphenol, 2-methyl-4-t-octylphenol, 2-t-octyl-4-methylphenol, 2,4-di-t-octylphenol, 2-nonyl-4-methylphenol, 2-methyl-4-nonylphenol, 2,4-dinonylphenol, 2-methyl-4-(alpha-methylbenzyl)phenol, 2-(alpha-methylbenzyl)-4-methylphenol, 2,4-di-(alpha-methylbenzyl)phenol, 2-methyl-4-(alpha,alpha-dimethylbenzyl)phenol, 2-(alpha,alpha - dimethylbenzyl)-4-methylphenol and 2,4-di-(alpha,alpha-dimethylbenzyl) phenol.

The amines which may be used include the following:
(1) Ammonia.
(2) Primary and secondary alkyl amines from methyl- and dimethylamine to dodecyl- and didodecylamine.
(3) Cycloalkylamines such as cyclohexylamine and dicyclohexylamine.
(4) Aralkylamines such as benzylamine and dibenzylamine.
(5) Aromatic amines such as aniline, methylaniline, diphenylamine and phenyl-β-naphthylamine.
(6) Hydroxyalkylamines such as ethanolamine and diethanolamine.
(7) Hydrazine.
(8) Substituted hydrazines such as methylhydrazine, dimethylhydrazine, didodecyl hydrazine and phenylhydrazine.
(9) Hydroxylamine.

EXAMPLE 1

*Preparation of N-(2-hydroxy-3-t-butyl-5-methyl-benzyl) aniline*

2-hydroxy-3-t-butyl-5-methylbenzyl 2 - benzothiazolyl sulfide was first prepared as follows:

2-mercaptobenzothiazole (584.5 g., 3.5 moles) was suspended in one liter of isopropyl alcohol in a 3-liter 3-neck flask equipped with a mechanical stirrer, condenser, thermometer and addition funnel. To the suspension was added 292 g. (3.6 moles) of 37% aqueous formaldehyde and the mixture was warmed to 60–70° C. for 30 minutes. 2-t-butyl-p-cresol (492 g., 3 moles) was then added followed by 100 ml. of concentrated hydrochloric acid. The mixture was then refluxed for four hours with stirring, the crystalline product beginning to precipitate out after one hour. The mixture was cooled and the product was filtered off, washed with isopropyl alcohol and dried. The yield of 2-hydroxy-3-t-butyl-5-methylbenzyl 2-benzothiazolyl sulfide was 744 g. (72%), m. pt. 164–165° C.

To a solution of 4.7 g. (0.05 mole) of aniline and 9 ml. (0.05 mole) of 6 N NaOH in 50 ml. of ethanol was added 17.1 g. (0.05 mole) of 2-hydroxy-3-t-butyl-5-methylbenzyl 2-benzothiazolyl sulfide. The solution was heated at reflux for 15 minutes. On cooling, the product crystallized out and was filtered off and dried. The yield of N-(2-hydroxy-3-t-butyl-5-methylbenzyl)aniline was 10 g. (74%), M.P. 118–121° C.

*Analysis.*—Calc'd: Percent C, 80.4; percent H, 8.62; percent N, 5.21. Found: Percent C, 80.4; percent H, 8.72; percent N, 5.64.

EXAMPLE 2

*Preparation of 1,1-dimethyl-2-(2-hydroxy-3-t-butyl-5-methylbenzyl)hydrazine*

To a mixture of 32.2 g. (0.094 mole) of 2-hydroxy-3-t-butyl-5-methylbenzyl 2-benzothiazolyl sulfide and 30 ml. of dimethylhydrazine was added a solution of 6.6 g. (0.1 mole) of 85% potassium hydroxide in 10 ml. of water. The solution was heated at reflux for 15 minutes and was then poured into ice water. The organic product was extracted with hexane, washed with water and evaporated down to a liquid residue which crystallized. The product was recrystallized from hexane to give 1,1-dimethyl - 2 - (2 - hydroxy-3-t-butyl-5-methylbenzyl)hydrazine, M.P. 59–60° C.

*Analysis.*—Calc'd: Percent C, 71.2; percent H, 10.2; percent N, 11.9. Found: Percent C, 71.2; percent H, 10.5; percent N, 11.8.

EXAMPLE 3

*Preparation of N,N-bis(2-hydroxy-3-t-butyl-5-methylbenzyl)hydroxylamine*

A solution of 34.3 g. (0.1 mole) of 2-hydroxy-3-t-butyl-5-methylbenzyl 2-benzothiazolyl sulfide, 3.5 g. (0.05 mole) of hydroxylamine hydrochloride and 27 ml. (0.15 mole) of 6 N sodium hydroxide in 75 ml. of ethylene glycol dimethyl ether was heated at reflux for 10 minutes. A white precipitate formed. The mixture was poured into water and the solid product was filtered off, washed with water and dried. The yield of N,N-bis(2-hydroxy-3-t-butyl-5-methylbenzyl)hydroxylamine was 17.5 g. (90%), M.P. 250° C. (dec.).

EXAMPLE 4

*Preparation of 2-(alpha,alpha-dimethylbenzyl)-4-methyl-6-(dimethylaminomethyl)phenol*

2 - hydroxy-3-(alpha,alpha - dimethylbenzyl)-5-methylbenzyl 2-benzothiazolyl sulfide was first prepared as follows:

A mixture of 226 g. (1 mole) of 2-(alpha,alpha-dimethylbenzyl)-p-cresol, 33 g. (1.1 mole) of paraformaldehyde, 167 g. (1 mole) of 2-mercaptobenzothiazole, 2 g. of p-toluene-sulfonic acid and 250 ml. of benzene was placed in a one liter, 3-neck flask and refluxed for four hours. The water of reaction (16 ml.) was azeotroped out as formed and collected in a Stark and Dean trap (theory=18 ml.). The benzene solution was washed with dilute aqueous sodium hydroxide to remove unreacted 2-mercaptobenzothiazole and was then concentrated down to a liquid residue which was crystallized from benzene. The yield of 2-hydroxy-3-(alpha,alpha-dimethylbenzyl)-5-methylbenzyl 2-benzothiazolyl sulfide was 101.5 g. (33%), M.P. 141–145° C.

To a solution of 112 g. (0.6 mole) of 25% aqueous dimethylamine and 16 g. (0.2 mole) of 50% sodium hydroxide in 350 ml. of ethanol and 100 ml. of ethylene glycol dimethyl ether was added 81 g. (0.2 mole) of 2-hydroxy-3-(alpha,alpha - dimethylbenzyl)-5-methylbenzyl 2-benzothiazolyl sulfide. The mixture was heated at reflux for 30 minutes. The resulting solution was then cooled and the solid which precipitated out was filtered off, washed with ethanol and dried. The yield of 2 - (alpha,alpha - dimethylbenzyl)-4-methyl-6-(dimethylaminomethyl)phenol was 49 g. (87%), M.P. 106–107° C.

The hydrazines having the following formula are new chemicals:

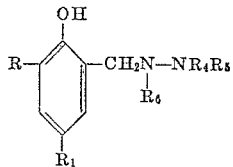

wherein R and $R_1$ are alkyl, cycloalkyl or aralkyl groups of up to 12 carbon atoms each, $R_4$ and $R_5$ may be hydrogen, alkyl, cycloalkyl, aralkyl or aryl groups of up to 12 carbon atoms each and $R_6$ may be hydrogen, alkyl, cycloalkyl, aralkyl or aryl groups of up to 12 carbon atoms or the group;

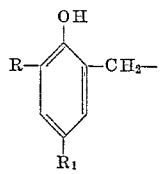

in which R and $R_1$ are as previously defined. Preferred chemicals of this kind are:

(a) 2-hydroxy-3,5-dialkylbenzyl hydrazines
(b) N,N-bis(2-hydroxy-3,5-dialkylbenzyl) hydrazines
(c) N,N - dialkyl - N' - (2 - hydroxy - 3,5 - dialkylbenzyl) hydrazines, and
(d) N,N - dialkyl - N',N' - bis(2 - hydroxy - 3,5 - dialkylbenzyl) hydrazines;

especially where the alkyl groups are lower alkyl (e.g. 1 to 6 carbon atoms). Specific examples of such chemicals are:

(a) 2-hydroxy-3-t-butyl-5-methylbenzyl hydrazine
(b) N,N-bis(2-hydroxy-3-t-butyl-5-methylbenzyl) hydrazine
(c) 1,1 - dimethyl - 2 - (2 - hydroxy - 3 - t - butyl - 5-methylbenzyl) hydrazine, and
(d) 1,1 - dimethyl - 2,2 - bis(2 - hydroxy - 3 - t - butyl-5-methylbenzyl) hydrazine.

These chemicals may be made by the new method described. They are useful as antioxidants in organic materials normally subject to oxidative deterioration, e.g., rubbers, whether natural or synthetic, especially diolefin polymers, such as polybutadiene, polyisoprene, copolymers of butadiene with styrene, acrylonitrile, vinyl pyridine and the like; also olefin polymers, especially ethylene-propylene-diene (1,4-hexadiene, dicyclopentadiene, bicyclooctadiene,) rubbers. Thus, a natural rubber vulcanizate containing 1 part of N,N-dimethyl-N'-(2-hydroxy-3-t-butyl-5-methylbenzyl) hydrazine, for example, per 100 parts by weight of rubber, has several times greater tensile strength, after aging in an oxygen bomb for 96 hours at 70° C., than an otherwise similar vulcanizate not containing this chemical.

Having thus described my invention, what I claim and desire to protect by Letters Patent is:

1. A method of making a compound of the formula:

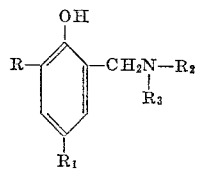

wherein R and $R_1$ are selected from the group consisting of alkyl and aralkyl groups of up to 10 carbon atoms and cyclohexyl, and $R_2$ and $R_3$ are selected from the group consisting of —H, —OH, —$NR_4R_5$, alkyl groups of up to 12 carbon atoms, cyclohexyl, benzyl, hydroxyethyl, phenyl, naphthyl, and the group

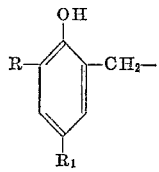

in which R and $R_1$ are as previously defined, the said $R_4$ and $R_5$ being selected from the group consisting of hydrogen, and alkyl groups of up to 12 carbon atoms, comprising heating at a temperature of from room temperature to 100° C. one molar equivalent of a compound of the formula

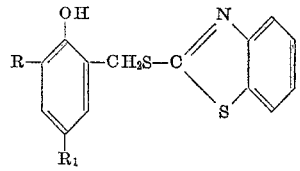

wherein R and $R_1$ are as previously defined with one molar equivalent of an alkali metal hydroxide and a substance selected from the group consisting of (a) at least one molar equivalent of an amine of the formula $R_2R_3NH$ in which $R_2$ and $R_3$ are as previously defined and (b) 0.5 molar equivalent of an amine of the formula $R_2NH_2$ in which $R_2$ is as previously defined.

2. A method comprising heating one molar equivalent of a compound of the formula wherein R and $R_1$ are selected from the group consisting of alkyl and aralkyl groups of up to 10 carbon atoms and cyclohexyl at a temperature from room temperature to 100° C. with one molar equivalent of an alkali metal hydroxide and a stoichiometric amount of an amine selected from the group consisting of ammonia, primary and secondary alkyl amines in which the alkyl groups contain up to 12 carbon atoms, cyclohexylamine, dicyclohexylamine, benzylamine, dibenzylamine, aniline, methylaniline, diphenylamine, phenyl-β-naphthylamine, ethanolamine, diethanolamine, hydrazine, alkyl and dialkylhydrazines in which the alkyl groups contain up to 12 carbon atoms, phenylhydrazine and hydroxylamine.

3. A method of making N-(2-hydroxy-3-t-butyl-5-methylbenzyl) aniline comprising heating, at a temperature from room temperature to 100° C., one molar equivalent of 2-hydroxy-3-t-butyl-5-methylbenzyl 2-benzothiazolyl sulfide, one molar equivalent of alkali metal hydroxide, and one molar equivalent of aniline.

4. A method of making 1,1-dimethyl-2-(2-hydroxy-3-t-butyl-5-methylbenzyl) hydrazine comprising heating at a temperature from room temperature to 100° C., one molar equivalent of 2-hydroxy-3-t-butyl-5-methylbenzyl 2-benzothiazolyl sulfide, one molar equivalent of alkali metal hydroxide, and at least one molar equivalent of dimethylhydrazine.

5. A method of making N,N-bis(2-hydroxy-3-t-butyl-5-methylbenzyl)-hydroxylamine comprising heating, at a temperature from room temperature to 100° C., one molar equivalent of 2-hydroxy-3-t-butyl-5-methylbenzyl 2- benzothiazolyl sulfide, one molar equivalent of alkali metal hydroxide and 0.5 molar equivalent of hydroxylamine.

6. A method of making 2-(alpha,alpha-dimethylbenzyl) - 4 - methyl - 6 - (dimethylaminomethyl)phenol comprising heating, at a temperature from room temperature to 100° C., one molar equivalent of 2-hydroxy-3-(alpha, alpha-dimethylbenzyl)-5-methylbenzyl 2-benzothiazolyl sulfide, one molar equivalent of an alkali metal hydroxide, and one molar equivalent of dimethylamine.

References Cited by the Examiner

UNITED STATES PATENTS 2,953,600 9/1960 Rudner et al. ----- 260—569 X
2,962,531 11/1960 Coffield ---------- 260—570.9

OTHER REFERENCES

Euler et al.: "Chemical Abstracts," vol. 37, page 6255 (1943).

CHARLES B. PARKER, *Primary Examiner.*